United States Patent [19]

Lundgren

[11] 4,438,991
[45] Mar. 27, 1984

[54] BEARING HOUSING

[75] Inventor: Bengt Lundgren, Lerum, Sweden

[73] Assignee: SKF Nova AB, Sweden

[21] Appl. No.: 438,913

[22] Filed: Nov. 3, 1982

[30] Foreign Application Priority Data

Jan. 14, 1982 [SE] Sweden .............................. 8200173

[51] Int. Cl.³ .......................................... F16C 35/077
[52] U.S. Cl. ............................................... 308/189 R
[58] Field of Search ........... 308/189 R, 207 R, 189 A, 308/207 A; 384/439, 428, 441, 438

[56] References Cited

U.S. PATENT DOCUMENTS 3,115,373 12/1963 Alexander ........................... 384/439
3,372,960 3/1968 Fisher .................................. 384/439
3,770,109 11/1973 Kraft .................................... 384/428
3,789,300 1/1974 Ham ..................................... 384/441
4,240,677 12/1980 Payne et al. ......................... 384/441

Primary Examiner—Lenard A. Footland
Attorney, Agent, or Firm—Eugene E. Renz, Jr.

[57] ABSTRACT

The invention relates to a bearing housing (1) for supporting a bearing (2) in a bearing seat arranged in the housing. In order to provide a rigid, strong, lightweight and inexpensive bearing housing, the housing has the shape of a tube with a mainly rectangular cross section. The axis (3) of a bearing mounted in the housing extends mainly perpendicular to two housing walls (4) facing each other and the bearing is enclosed by the housing.

7 Claims, 5 Drawing Figures

BEARING HOUSING

The invention relates to a bearing housing for supporting a bearing in a seat arranged in the housing.

Bearing housings of various designs have been known for a long time. They generally comprise a seat for a bearing and devices for fastening the housing against a foundation. The housings are usually cast or made in the form of sheet metal constructions. Cast housings are rigid and strong but comparatively heavy and expensive. Sheet metal housings are generally lighter and at times more inexpensive than cast housings, but comparatively weak.

The object of the present invention is to provide a bearing housing which is rigid, strong and lightweight and which can be produced at a low cost. This is achieved, according to the invention, by providing the housing with the characterizing features stated in the appended Claim 1.

Such a bearing housing can be manufactured from a comparatively thin-walled material at a lower cost than a cast iron housing with a corresponding ridigity and strength.

In the following invention is described in detail with reference to the accompanying drawing, in which.

Figure 1:
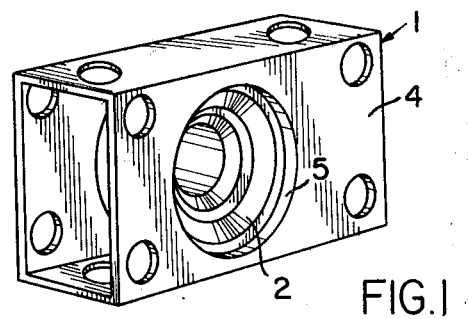
FIG. 1 shows a perspective view of a bearing housing according to one embodiment of the invention with a bearing mounted in it.
Figure 2:
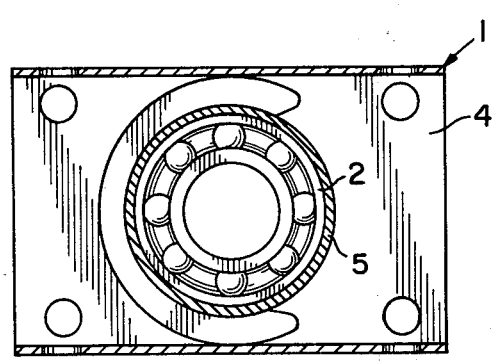
FIG. 2 shows a section through the housing shown in FIG. 1 in a plane perpendicular to the bearing axis.
Figure 3:
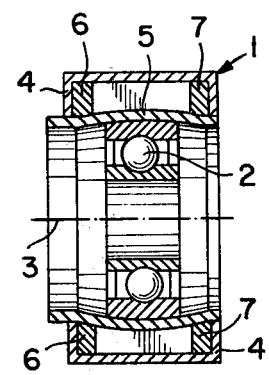
FIG. 3 shows a section through the same housing in a plane parallel to the bearing axis.

As appears from FIGS. 1–3, the bearing housing 1 has the shape of a tube with a mainly rectangular section. A bearing 2, here shown as a deep groove ball bearing, is arranged in the housing. The bearing axis 3 extends mainly perpendicular to two walls 4 of the housing facing each other, and the bearing is enclosed in the housing.

In the embodiment shown, the bearing seat is made in an insertion 5 in the shape of a tube with a circular section. The insertion is arranged in circular bores in the walls 4 of the housing positioned perpendicular to the bearing axis 3. A suitable way of keeping the insertion in its proper position in the housing is to place snap rings 6, 7 into recesses in the outer surface of the insertion and contacting the insides of the housing. Thereby it is possible to mount and dismount the insertion and a bearing arranged in it easily into and out of the housing 1.

In the embodiment shown, the bearing seat consists of a spherical portion of the inner surface of the insertion 5. The outer ring of the bearing has an outer surface which is shaped in correspondence thereto. Thereby the bearing is self-aligning by the fact that the outer ring can be turned in the insertion.

Mounting means for fastening the housing to a foundation are provided in connection to at least one of the sides of the housing. In the figures, these means are shown in the form of screw bores made through the walls for co-operation with screws (not shown) intended for being secured to the foundation.

Figure 4:
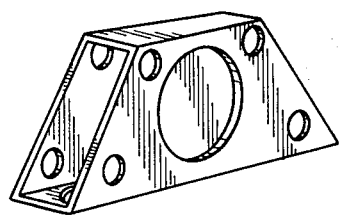
FIG. 4 shows a view of a modified embodiment of the bearing housing.

FIG. 4 shows a modified embodiment of the bearing housing, which has the shape of a trapezium in a front view. Thereby the access to the screw bores in the bottom surface of the housing is improved, and material is saved.

Figure 5:
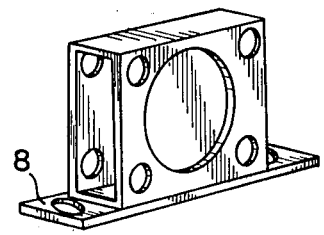
FIG. 5 shows a view of another embodiment of the bearing housing.

FIG. 5 shows a mounting plate 8 secured to one of the sides of the housing. The screw bores made through the plate are easily accessible. The plate may for example be welded to the bottom side of the housing.

A bearing housing according to the invention can be manufactured easily by for example cutting and boring in easily obtainable tubular pieces. Thanks to the box-like shape of housing it is rigid also when the material used is comparatively thin.

Other embodiments of the invention than those just described are of course possible within the scope of the claims. For example, the insertion 5 may be secured in the housing by other means than snap rings, e.g. by saddles or other supporting members of suitable shape, which are fastened to the inside of the housing. The bearing may possibly be molded in the housing with a molding composition which surrounds the outer ring of the bearing and at least partly fills the space inside the housing. It is also possible to extend the outer ring of the bearing axially and secure it to the housing in the same way as the insertion 5 is secured. Thereby there will be no need for an insertion. Seals may suitably be provided at the side planes of the bearing and connected to the insertion or the extended portions of the outer ring of the bearing. The insertion may extend outside the housing (FIG. 3) in order to take up and cover a seal. Other kinds of bearings than the one described can be built into a housing according to the invention, e.g. ball or roller bearings which are self-aligning by the presence of spherically formed raceways for the rolling bodies. A certain axial mobility of the bearing and the insertion 5 in the housing is allowed if the insertion 5 is fastened by elastic snap rings arranged in grooves with slightly sloping sides and the snap rings have a radial clearance in the housing.

A bearing housing which can take up great bending moments of a shaft supported by the housing can be achieved if two bearings are arranged co-axially in the housing as far apart as possible. Thereby the shaft can run parallel to those housing walls defining the longer side of the rectangular tube section.

The front view of the housing may have a shape which departs from a rectangle or a trapezium. For example, the shorter sides can be curved.

The housing can be made of a sheet metal blank which is stamped to a suitable shape, whereafter it is folded to tubular shape and e.g. seam welded.

The cross-section of the housing may depart somewhat from the rectangular shape. For example, the sides may be slightly curved and the corner angles may be a little more or less than 90°. The corners are preferably rounded.

I claim:

1. Bearing housing (1) for supporting a bearing (2) in a bearing seat arranged in the housing, characterized by that the housing has the shape of a tube with a mainly rectangular cross section, whereby, when a bearing is arranged in the housing, the bearing axis (3) extends mainly perpendicular to two housing walls (4) facing each other and the bearing is enclosed by the housing.

2. Bearing housing according to claim 1, characterized by that the bearing seat is formed in an insertion (5) in the shape of a tube with a circular cross section, which insertion is arranged in circular bores in the housing walls (4) arranged mainly perpendicular to the bearing axis.

3. Bearing housing according to claim 2, characterized by that the insertion is kept in position by snap rings (6, 7) arranged in recesses in the outer surface of the insertion and contacting the insides of the housing.

4. Bearing housing according to claim 2 characterized by that the insertion has an inner surface with a spherical portion which constitutes the seat for a bearing having an outer ring with an outer surface with a corresponding spherical shape.

5. Bearing housing according to any one of claim 1 characterized by that mounting means are provided in connection to at least one of the sides of the housing.

6. Bearing housing according to claim 5, characterized by a mounting plate (8) secured to one of the sides of the housing.

7. Bearing housing according to claim 1, characterized by that the bearing seat is arranged in a molding composition which is enclosed by the walls of the housing and encloses the outer ring of the bearing.

* * * * *